Figure 1:
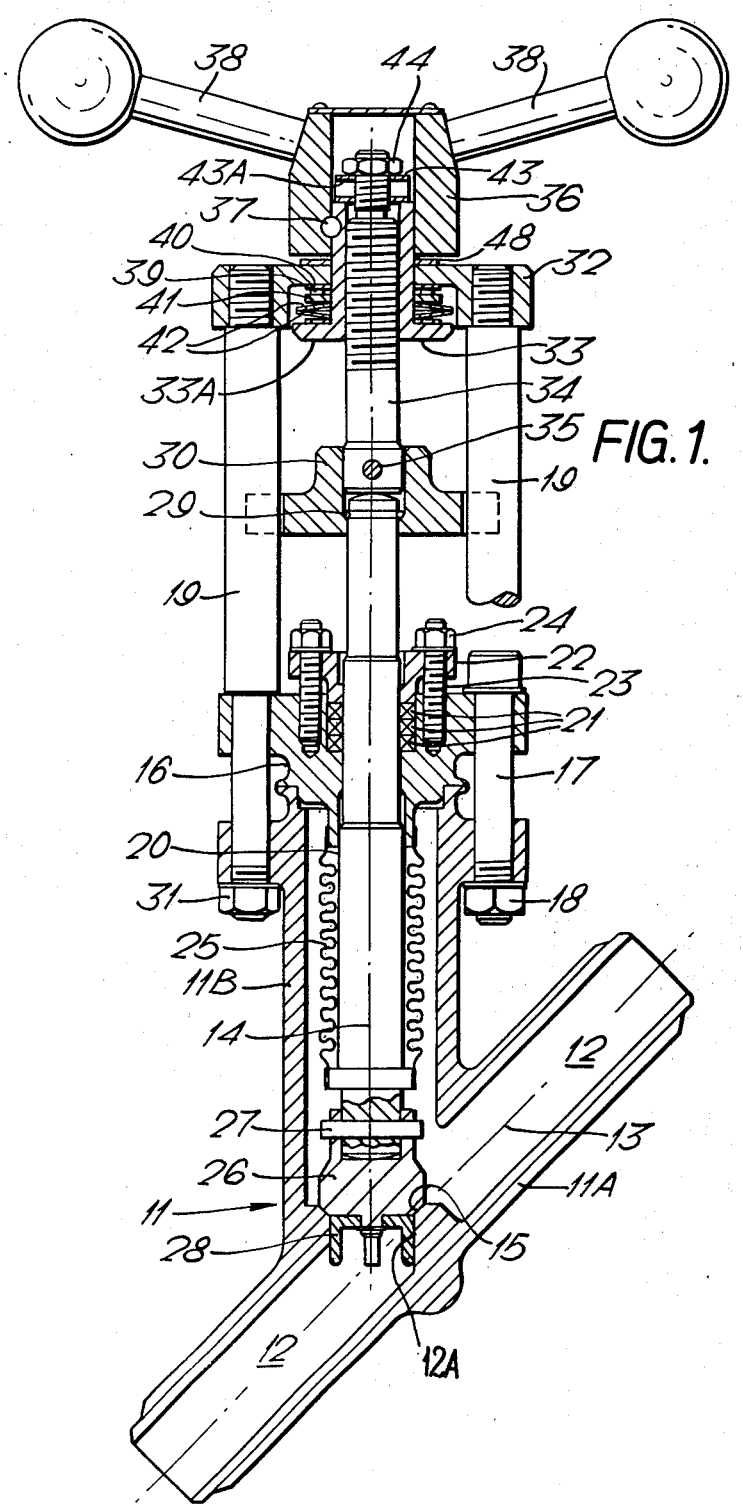

United States Patent [19]
Orszak

[11] 3,934,814
[45] Jan. 27, 1976

[54] FLUID-FLOW CONTROL VALVE

[75] Inventor: Peter Orszak, Oadby, England

[73] Assignee: The English Electric Company Limited, London, England

[22] Filed: Apr. 22, 1974

[21] Appl. No.: 462,736

[30] Foreign Application Priority Data
Oct. 23, 1973 United Kingdom............... 49215/73

[52] U.S. Cl.................................. 251/80; 251/272
[51] Int. Cl.² ........................................ F16K 31/50
[58] Field of Search .................. 251/80, 81, 77, 272

[56] References Cited
UNITED STATES PATENTS
2,255,929  9/1941  Huston............................. 251/80 X
2,391,898  1/1946  Hobbs............................ 251/272 X FOREIGN PATENTS OR APPLICATIONS
957,267  5/1964  United Kingdom................... 251/80

Primary Examiner—Alan Cohan
Attorney, Agent, or Firm—Kirschstein, Kirschstein, Ottinger & Frank

[57] ABSTRACT

In a fluid-flow control valve provided with jacking means (which may comprise a nut rotatable on a threaded shaft) operable to move a valve closure member into and out of seating engagement with a valve seat and to exert between the valve closure member and a reaction member, fixed in position relative to the valve seat, a thrust which holds the valve closure member on the valve seat, there is interposed between the jacking means and either the valve closure member or the reaction member a resiliently-deformable thrust-transmitting means (e.g. a pair of Belleville springs); and the jacking means is provided with stop means which limits the extent to which the jacking means can deform the thrust-transmitting means after the valve closure member has seated on the valve seat, thereby limiting said thrust to a safe maximum value dependent on the adjustment of the stop means.

9 Claims, 2 Drawing Figures

FLUID-FLOW CONTROL VALVE

This invention relates to a fluid-flow control valve of the kind having an annular vakve seat surrounding an aperture provided for fluid flow, a valve closure member mounted for movement into and out of seating engagement on the valve seat, and jacking means for applying a thrust between stationary parts of the valve and the valve closure member in order to seat the latter on the valve seat and close the valve.

It is an object of the invention to provide means by which the thrust which may be applied to the valve closure member may be limited, whereby to reduce the risk of damage to the valve seat and valve closure member.

According to the invention there is provided a valve body defining a fluid-flow aperture and having a valve seat surrounding the aperture, a valve closure member movably mounted in the body, a reaction member secured on the body in fixed position relative to the valve seat, and jacking means operable to move the closure member into and out of seating engagement on the valve seat and to exert between the closure member and the reaction member a thrust which holds the valve closure member seated on the valve seat, wherein there is interposed between the jacking means and one of the said members a resiliently deformable thrust-transmitting means and the jacking means is provided with stop means which limits the deformation the jacking means can effect in the thrust-transmitting means after the valve closure member has seated on the valve seat.

In embodiments of the invention which are presently preferred and which comprise an axially slidable valve stem having a first end on which the valve closure member is mounted and a second end which protrudes from the valve body, the jacking means comprises a threaded shaft, coaxial with the valve stem and axially movable therewith, and a nut threadedly engaged upon the shaft and rotatable relative thereto, the reaction member having an aperture in which the nut is rotatably mounted and a face surrounding said aperture and directed towards the valve seat, the nut having a face opposed to said face of the reaction plate and there being provided a thrust bearing, disposed around the nut and between these two faces, and means which secures the shaft against rotation relative to the reaction member.

In one such preferred embodiment of the invention, the said resiliently-deformable thrust-transmitting means is annular and is disposed surrounding the nut and between the said thrust bearing and one of the two said faces, and the nut is axially slidable on the said aperture of the reaction member as well as being rotatable therein, and the shaft is secured in end-to-end abutment with the valve stem at the said second end thereof.

In another of such perferred embodiments, the nut, rotatably mounted in the said aperture of the reaction member, is axially fixed therein and the shaft and the valve stem are secured in end-to-end alignment with limited axial play between them, and there are provided two mutually opposed surfaces, fixed relative to the shaft and to the valve stem respectively, and the said resiliently-deformable thrust-transmitting means is disposed between the said two surfaces so as to resist relative movement of the shaft and the valve stem toward one another.

In both cases, preferably, the shaft of the jacking means extends through the nut thereof and has a part which is more remote from the valve stem than is the nut, and the stop means is secured on the said part and limits axial movement of the nut, relative to the shaft, in the direction away from the valve stem.

Figure 2:
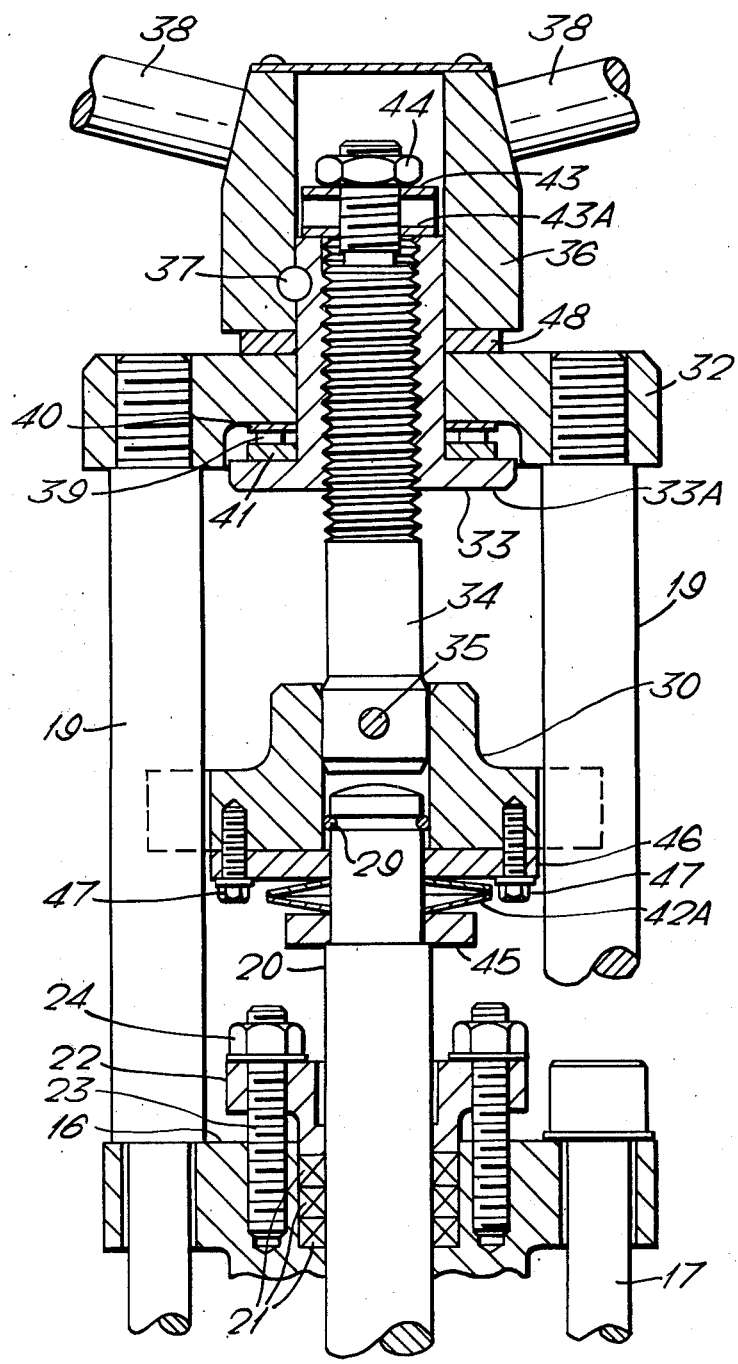

Two such presently preferred valves embodying the invention are described below with reference to the accompanying drawing, in which:

FIG. 1 is an axial sectional view of the first of the valves to be described, and FIG. 2 is a similar view, on a larger scale, of part of the second embodiment.

The valve shown in FIG. 1 comprises a valve body 11 of generally Y-shape, having a fluid duct section 11A which forms a duct 12 with an axis 13 and a tubular branch section 11B with an axis 14 inclined to the axis 13. Surrounding a fluid-flow aperture 12A formed internally in the duct 12, and disposed in a plane normal to the axis 14, is an annular valve seat 15.

The free end of the branch section 11B is closed by a bonnet 16 secured thereon by bolts 17 and nuts 18 and by columns 19 further described below. The bonnet 16 is bored axially to receive a valve stem 20 and support it for axial sliding movement on the axis 14. Stuffing box rings 21 surrounding the stem 20 are held under compression by an annular retainer 22 surrounding the stem and secured on the bonnet 16 by studs 23 and nuts 24 threaded thereon. Within the branch section 11B is an extensible bellows 25 which surrounds the stem 20 and whose ends are sealed respectively to the stem and to the bonnet 16.

On one end of the stem 20, within the branch section 11B, a valve closure member 26 is secured by means of a pin 27, and axial movement of the stem moves the valve closure member into and out of sealing engagement with the valve set 15. The closure member 26 is provided with a guide spider 28 which is slidably engaged in the aperture 12A and which maintains alignment of the closure member with the axis 14 when the valve is open. At its other end, the stem 20 is formed with an annular groove in which is located a ring 29 which retains the end of the stem within a shouldered bore of a spider 30 which slides between the columns 19 but is prevented, by its engagement with them, from rotating about the axis 14.

As already described, the columns 19, secured by nuts 31 at their lower ends, assist in securing the bonnet 16 in place. The columns 19 (of which there may be three, equally spaced round the bonnet 16 and alternating with three equally spaced bolts 17) extend upwardly from the bonnet 16, parallel with the axis 14, and on their upper ends is mounted a top plate 32. The top plate 32 has a central aperture 32A in which is rotatably mounted an internally threaded nut 33 which is threadedly engaged upon a threaded shaft 34 coaxial with the stem 20 and axially movable therewith. The shaft 34 extends into the bore of the spider 30 where it is secured in end-to-end abutment with the stem 20 by means of a cross pin 35. This cross pin, and the engagement of the columns 19 by the spider 30, prevent rotation of the shaft 34, which must therefore move axially relative to the nut 33 if the latter is rotated. A hand wheel for rotating the nut 33 comprises a bored central boss 36, secured on the nut by a pin 37, and projecting spokes 38.

In the above-described structure, the nut 33 and shaft 34 constitute jacking means operable to move the valve closure member 26 into and out of seating engagement on the valve seat 15 and to exert between the valve closure member an the top plate 32 (which, being secured on the valve body 11 in fixed position relative to the valve seat 15, functions as a reaction member) a thrust which holds the valve closure member seated on the valve seat.

If the axial position of the nut 33 were fixed, rotation of the handwheel 37, 38 would produce a corresponding proportional axial movement of the valve closure member 26 towards or away from the valve seat 15, and excessive rotation of the handwheel might result in damage to the valve seat or closure member due to excessive pressure between them. In accordance with the invention, however, axial movement of the nut 33 in the direction away from the valve seat 15 is resiliently opposed. To that end there is provided, surrounding the nut 33 and disposed between a face of an outwardly extending flange 33A thereof and an opposed face of the top plate 32, not only a thrust bearing (comprising a needle thrust race 39 between stationary and moving bearing plates 40 and 41) but also resiliently deformable thrust-transmitting means constituted by a pair of Belleville springs 42 which, like the thrust bearing, are annular and surround the nut 33. Furthermore, a reduced-section upper end of the shaft 34 which extends beyond the upper end of the nut 33 has threadedly mounted on it a stop member 43 locked in position by a locknut 44.

On rotation of the handwheel to close the valve, the thrust applied to the valve closure member 26 does not exceed that applied to compress the Belleville springs 42, and the position of the stop member 43 is adjusted to stop rotation of the handwheel (and accompanying upward movement of the nut 33) before the Belleville springs 42 are fully compressed.

Since the central boss 36 of the handwheel surrounds and encloses the stop member 43 and locknut 44, adjustment of the stop member 43 can only be effected with the handwheel removed, which makes accidental or unauthorised re-adjustment difficult. To adjust the stop member, the nut 33 is first rotated until the valve closure member 26 just seats on the valve seat 15, then with the locknut 44 slackened off, the stop member 43 (provided with radial holes 43A so that a bar may be inserted for the purpose) is turned until the gap between it and the upper end of the nut 33 is equal to the compression of the springs 42 which the desired sealing thrust would produce. Then the stop member 43 is locked in place by the lock nut 44 and the handwheel and its pin 37 are re-fitted.

If the fluid flowing in the duct 12 and surrounding the bellows is at a high temperature (up to about 650°C, for example, if it is molten sodium) there may be a considerable thermal-expansion differential in the direction of the axis 14 between the valve stem 20 and the shaft 34 on the one hand and the housing 11 and columns 19 on the other; and the stop member 43 may be adjusted so that the sealing thrust exerted on the valve closure member will be adequate, but not excessive, at any temperature within the range which may be encountered in use of the valve.

The valve of which part is shown in FIG. 2 is substantially identical with that shown in FIG. 1, except for such differences as are referred to below; and the same reference numerals are used in the two Figures to denote corresponding parts. As shown in FIG. 2, no Belleville springs or other resilient means are provided between the flange 33A of the nut 33 and the needle thrust bearing 39, 40, 41 by which the nut is rotatably mounted in the top plate 32; and the nut 33 is not axially displaceable relative to the top plate 32. Instead the stem 20 is formed, above the bonnet 16 and stuffing box retainer 22, with a shoulder which provides a seating for a collar 45. A pair of Belleville springs 42A surrounds the stem 20 above the collar 45, being disposed between mutually opposed surfaces of the collar 45 and of a centrally apertured plate 46 which is secured on the spider 30 by bolts 47. The upper end of the stem 20 extends through the plate 46 and into the central bore of the spider 30, where it is held captive by its retainer ring 29. As in the valve shown in FIG. 1, the upper end of the stem 20 and the shaft 34 are held in end-to-end alignment in the central bore of the spider 30, but (in the case of FIG. 2) with limited axial play between them.

When the Belleville springs 42A are uncompressed, the plate 46 is close to, or in loose contact with, the underside of the ring 20 and there is an axial clearance, between the mutually adjacent ends of the stem 20 and the shaft 34, which is greater than the maximum compression to which the Belleville springs will be subjected in closing the valve (as limited by the stop member 43).

It will be appreciated that both FIGS. 1 and 2 show the relative positions of the parts when the valve closure member 26 is seated on the valve seat 15 under maximum pressure for the illustrated adjustment position the stop member 43, since in both cases the nut 33 is already against the stop member and no further tightening of the valve is possible. As the handwheel 36, 38 is rotated in the direction to open the valve, the shaft 34 (in the construction shown in FIG. 1) remains initially stationary and the nut 33 moves axially downwards relative to the shaft and to the top plate 32, so that the compression of the Belleville springs 42 is relaxed and the thrust which they transmit from the top plate 32 to the valve closure member 26 (via the nut 33, shaft 34 and stem 20) is reduced. Once the descending boss 36 of the handwheel engages the top plate 32 (or, as illustrated, an interposed washer 48), further downward movement of the nut 33 is prevented and continued rotation of the handwheel raises the shaft 34, together with the spider 30 and, because the shouldered central bore of the latter engages the ring 29, the valve stem 20 and the valve closure member 26 mounted thereon. In the construction shown in FIG. 2, the handwheel boss 36 and nut 33 have no axial movement relative to the top plate 32, and rotation of the handwheel in the direction to open the valve results, from the beginning, in upward movement of the shaft 34 and, therewith, of the spider 30 and plate 46. This initially does not raise the stem 20 but relaxes the compression of the Belleville springs 42A and reduces the thrust transmitted therethrough between the top plate 32 and the valve closure member 26, via the nut 33, shaft 34, spider 30, plate 46, collar 45 and valve stem 20. Continued upward movement of the shaft 34 brings the plate 46 into engagement with the ring 29, and is thereafter accompanied by upward movement of the stem 20 and of the valve closure member 26, to open the valve.

I claim:

1. A fluid-flow control valve comprising a valve body defining a fluid-flow aperture and having a valve seat surrounding the aperture, a valve closure member movably mounted in the body, a reaction member secured on the body in fixed position relative to the valve seat, jacking means operable to move the valve closure member into and out of seating engagement on the valve seat and to exert between the valve closure member and the reaction member a thrust which holds the valve closure member seated on the valve seat, a resiliently deformable thrust-transmitting means interposed between the jacking means and one of the said members, and stop means which limits the deformation the jacking means can effect in the thrust-transmitting means after the valve closure member has seated on the valve seat, wherein the jacking means comprises a threaded shaft portion, axially movable in unison with the valve closure member towards and away from the valve seat, and a nut threadedly engaged upon the shaft portion and rotatable relative thereto, the reaction member having an aperture in which the nut is rotatably mounted and a face surrounding said aperture and directed towards the valve seat, the nut having a face opposed to said face of the reaction member and there being provided a thrust bearing, disposed around the nut and between these two faces, and means which secures the shaft portion against rotation relative to the reaction member, and wherein the shaft portion of the jacking means extends through the nut thereof and has a part which is more remote from the valve seat than is the nut, and the stop means is secured on the said part and limits axial movement of the shaft portion, relative to the nut, in the direction towards the valve seat.

2. A valve as claimed in claim 1, and comprising a plurality of columns, parallel to each other and to the threaded shaft portion, which are secured to the valve body and on which the reaction member is secured in fixed position relative to the valve seat, and a spider, non-rotatably secured on the threaded shaft portion, axially-slidably engaging the columns and preventing rotation of the threaded shaft portion relative thereto.

3. A valve as claimed in claim 1, wherein the said resiliently-deformable thrust-transmitting means is annular and is disposed surrounding the nut and between the said thrust bearing and one of the two said faces, and the nut is axially slidable in the said aperture of the reaction member as well as being rotatable therein, and wherein the threaded shaft portion is secured, the valve closure member for axial movement in unison therewith substantially free of axial play relative thereto.

4. A valve as claimed in claim 3 and comprising a plurality of columns, parallel to each other and to the threaded shaft, which are secured to the valve body and on which the reaction member is secured in fixed position relative to the valve seat, and a spider, non-rotatably secured on the threaded shaft portion, axially-slidably engaging the columns and preventing rotation of the threaded shaft portion relative thereto.

5. A valve as claimed in claim 4, and comprising a valve stem coaxial with the threaded shaft portion and having a first end with the valve closure member mounted thereon and a second end, wherein the spider secures the said second end of the valve stem in endwise abutment with the said threaded shaft portion.

6. A valve as claimed in claim 1, and comprising a valve stem coaxial with the threaded shaft portion and having a first end with the valve closure member mounted thereon and a second end, wherein the nut, rotatably mounted in the said aperture of the reaction member, is axially fixed therein and the threaded shaft portion and the valve stem are secured in end-to-end alignment with limited axial play between the threaded shaft portion and the said second end of the valve stem, and wherein there are provided two mutually opposed surfaces, fixed relative to the threaded shaft portion and to the valve stem respectively, and the said resiliently-deformable thrust-transmitting means is disposed between the said two surfaces so as to resist relative movement of the threaded shaft portion and the valve stem toward one another.

7. A valve as claimed in claim 6 and comprising a plurality of columns, parallel to each other and to the threaded shaft portion, which are secured to the valve body and on which the reaction member is secured in fixed position relative to the valve seat, and a spider, non-rotatably secured on the threaded shaft, axially-slidably engaging the columns and preventing rotation of the shaft relative thereto.

8. A valve as claimed in claim 7, wherein the spider holds the said second end of the valve stem captive with limited axial play, the valve stem is provided with a collar, the said two surfaces are respectively an annular surface of the collar and an opposed annular surface of the spider surrounding the valve stem, and the resiliently-deformable thrust-transmitting means is annular and is disposed surrounding the valve stem.

9. A valve as claimed in claim 1, wherein there is secured on the nut, for rotation therewith, manually-operable nut-rotating means which comprises a central boss which surrounds the said part of the threaded shaft portion and the stop means thereon and which, unless removed from the nut, prevents adjustment of the stop means.

* * * * *